June 24, 1958     C. F. LEHNKERING     2,839,844
MATHEMATICAL INSTRUCTION GAME
Filed April 20, 1953
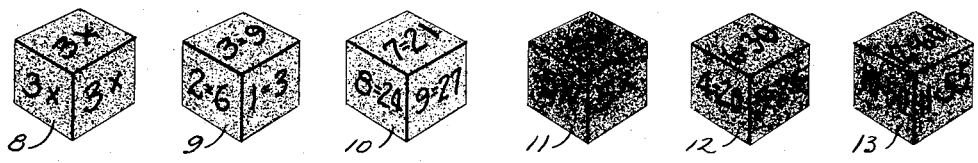
Fig. 1     Fig. 2
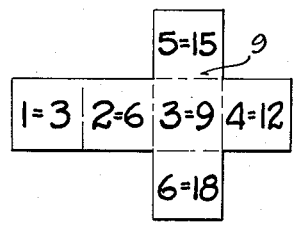     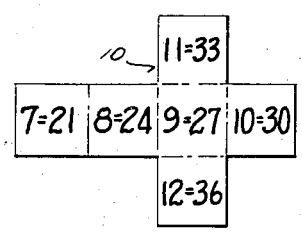
Fig. 3     Fig. 4
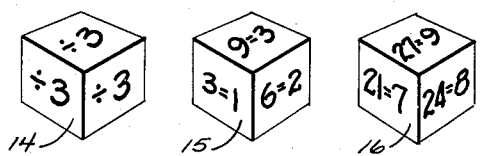     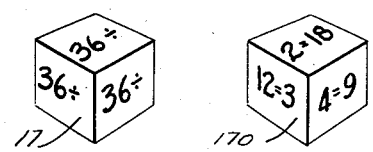
Fig. 5     Fig. 5A    Fig. 5B
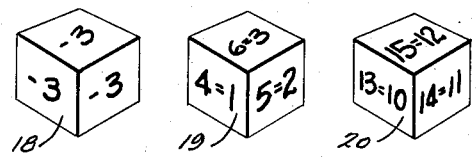     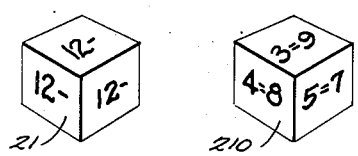
Fig. 6     Fig. 6A    Fig. 6B
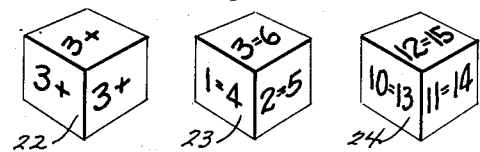
Fig. 7
INVENTOR.
CARL F. LEHNKERING
BY
Wheeler, Wheeler + Wheeler
ATTORNEYS

United States Patent Office 2,839,844
Patented June 24, 1958

2,839,844
MATHEMATICAL INSTRUCTION GAME

Carl F. Lehnkering, Shullsburg, Wis.

Application April 20, 1953, Serial No. 349,779

9 Claims. (Cl. 35—70)

This invention relates to a mathematical instruction game.

The invention may be used to teach any one such basic mathematical processes as multiplication, division, addition, and subtraction. In a simple game for teaching multiplication, for example, I use thirty-six blocks or dice comprising twelve series of three blocks each. In each series, one cubical block is designated as a multiplier block and bears on all six of its faces the same figure and the multiplication symbol. In the twelve multiplier blocks of this particular game, the figures used comprise all of the figures from 1 to 12 on separate blocks.

With the multiplier block in each series I use two multiplicand blocks, likewise cubical, and on their twelve faces are multiplicands from 1 to 12 with the "equals" sign and the answer or product of multiplying the given number by the multiplier on the multiplier block.

The three blocks comprising a series can be identified with each other by coloration or in any other suitable manner.

In the drawings:

Fig. 1 is a view in perspective of the three blocks of a single series in the simple form of game herein selected to exemplify the invention.

Fig. 2 is a view similar to Fig. 1 showing another typical series of three blocks used in this game.

Fig. 3 and Fig. 4 are respectively developed views of the faces of the multiplicand blocks shown in Fig. 1.

Fig. 5 is a view in perspective showing a set of three blocks used for teaching division.

Fig. 5A and Fig. 5B represent modified embodiments of the corresponding blocks shown in Fig. 5.

Fig. 6 is a view in perspective of a set of blocks used in teaching subtraction.

Fig. 6A and Fig. 6B are views in perspective showing modified embodiments of corresponding blocks shown in Fig. 6.

Fig. 7 is a view in perspective of a set of blocks used in teaching addition.

The block 8 in Fig. 1 is a cube of any desired size. It may be on the order of a die or a building block. Its six faces are all desirably colored alike and all desirably bear the same digit or other figure with which, in each case, is associated the multiplier sign. It is immaterial to the invention whether these figures are printed or embossed or cut into the faces of the block.

The blocks 9 and 10 are respectively multiplicand blocks. Desirably their background coloration corresponds to that of the multiplier block 8 of the same series. Together the blocks 9 and 10 have twelve faces. On each face there is a different multiplicand. In the basic game illustrated, these multiplicands include all the numbers from 1 to 12 inclusive and with each is associated the "equals" sign and the product. In each given series the control or multiplier block and the secondary or multiplicand blocks are identified first, by color or other similar background indication and, secondly, by the fact that throughout the blocks of the series the products given are in each instance the result of multiplying the indicated muliplicand by the indicated multiplier on block 8.

In Fig. 2, I have shown another selected series of three blocks respectively designated 11, 12, and 13, the multiplier block 11 having upon all of its six faces the multiplier 5 with the multiplication symbol. Blocks 12 and 13 are the multiplicand blocks and they carry on their respective faces multiplicands from 1 to 12 inclusive, each multiplicand having associated therewith the "equals" symbol and the product resulting from the multiplication of the given multiplicand by the multiplier found on each face of the block 11.

Because only three faces of blocks 9 and 10 are visible in Fig. 1, I have included in Fig. 3 and Fig. 4 developed views of all six faces of blocks 9 and 10 respectively. It will be understood that for the use of persons more skilled in arithmetic each series may be increased by additional blocks bearing multiplicands in the range of numbers higher than 12. Similarly the number of series may be increased as desired to use multipliers higher than 6. As the user becomes skilled in mathematics, it may be desirable to substitute blocks which are identical as to color so that, with all the blocks of the set spread out before him the user will have to select the blocks of a single series solely by reference to correctness of the methematical equation.

In the set of blocks used to teach division, one series of which is shown in Fig. 5, the control block 14 is a divisor block, all six faces of which bear the same divisor number (in this case the digit "3") preceded by the "division" symbol. The secondary blocks 15 and 16 of this series carry on their twelve faces quotients from 1 to 12 preceded by the "equals" symbol and the respective numbers which, divided by 3 yield the indicated quotients. As an alternative arrangement the first or control block of the series may have, s suggested in block 17 in Fig. 5A, each of its six faces bearing the same number, followed by the "division" symbol, in which case the secondary block 170 of the series (Fig. 5B) would carry a divisor by which such number is divisible and a quotient resulting from the division.

Fig. 6 shows a control block 18 which has on each of its six faces a minuend preceded by the "minus" symbol. The secondary blocks 19 and 20 have upon their respective faces the subtrahend and the appropriate difference. Fig. 6A shows a control block 21, all six faces of which bear the same subtrahend, in which case the secondary blocks 210, of the series (Fig. 6B), to any desired number, would have their faces respectively bearing the minuend, the "equals" symbol, and the difference.

Fig. 7 shows a series of blocks 22, 23, and 24 of which control block 22 has the same number on each of its six faces accompanied by the "plus" symbol, while secondary blocks 23 and 24 carry upon their respective faces the number to be added, accompanied by the "equals" symbol and the sum.

As in the case of the set of multiplication blocks first described, the blocks used in teaching division, subtraction, and addition may likewise be colored in such a way that all of the blocks comprising a given series, as above described, may be colored alike so that a beginning pupil can readily identify by color the blocks which are numerically correlated.

I claim:

1. A set of blocks for numerical instruction, the set comprising a plurality of series of cubical blocks, the blocks of a given series having distinguishing means identifying them with each other, each series comprising a control block having the same number on each of its faces, and at least one secondary block having upon each of its faces a second number and a third number with an intervening "equals" symbol, said control block carrying a mathematical symbol indicating the relationship between the first number and the second number to produce the third number as an answer.

2. The combination set forth in claim 1 in which the identifying means comprises a background color borne by all of the blocks of a given series and distinctively different from the background colors used upon other blocks of the set.

3. The combination set forth in claim 1 in which the control block comprises upon each of its faces a given multiplier, each secondary block of the same series comprising upon each of its several faces a multiplicand and "equal" symbol and the product of such multiplier and multiplicand, one of said blocks bearing the multiplication symbol.

4. The combination set forth in claim 1 in which the control block and secondary blocks respectively bear a minuend number and the subtrahend and difference numbers, one of said blocks bearing a symbol indicative of subtraction.

5. The combination set forth in claim 1 in which the control and secondary blocks bear upon their respective faces a dividend number, and a divisor and a quotient numbers, one of said blocks bearing a symbol indicative of division.

6. The combination set forth in claim 1 in which the mathematical symbol carried by the control block is a symbol indicative of addition, each secondary block carrying a first number to be added to the number carried by the control block, and a second number which is the sum of the number on the control block and the said number on the secondary block.

7. A set of blocks for instruction in arithmetic comprising twenty-four cubes in twelve sets of two cubes each, the cubes of each set having a distinctive coloration different from that of the cubes of any other set and each set comprising a control cube having the same number upon each of its six faces, and the same mathematical symbol on each such face, the other cube of the set having upon each of its faces different numbers in pairs, separated by an "equals" sign, the first number of each pair being related to the number of the control cube in such a way that the second number of each pair represents the answer derived from treating the first number of the pair in accordance with the mathematical symbol and the number appearing on the control cube.

8. A set of blocks for instruction in multiplication comprising at least six control cubes each of which is provided on all six of its faces with the same multiplier and a multiplication symbol, each control cube having associated with it at least two secondary cubes, the twelve faces of which bear respectively multiplicands from 1 to 12 inclusive, each such multiplicand being followed by the "equals" symbol and the product resulting from the multiplication of the multiplicand by the multiplier on the control cube.

9. The combination set forth in claim 8 in which each control cube and the secondary cubes associated therewith are identified by distinctive coloration.

References Cited in the file of this patent

UNITED STATES PATENTS

| | | |
|---|---|---|
| 239,385 | Irwin | Mar. 29, 1881 |
| 777,268 | Thompson | Dec. 13, 1904 |
| 1,115,441 | Lake | Oct. 27, 1914 |
| 1,696,988 | Troidl | Jan. 1, 1929 |
| 1,843,183 | Thompson | Feb. 2, 1932 |
| 2,654,963 | Van Dijck | Oct. 13, 1953 |

FOREIGN PATENTS

| | | |
|---|---|---|
| 22,073 | Australia | Aug. 27, 1929 |
| 525,040 | France | May 26, 1921 |